United States Patent
Lin et al.

(10) Patent No.: US 7,298,361 B2
(45) Date of Patent: Nov. 20, 2007

(54) NON-CONTACT ELECTRIC INDUCTANCE CIRCUIT FOR POWER SOURCE

(76) Inventors: Rung-Tsung Lin, 4F., No. 9, Alley 9, Lane 188, Sec. 1, Wunhua Rd., Banciao City, Taipei County 220, Taipei Hsien (TW); Ding-Kan Chang, 4F., No. 9, Alley 9, Lane 188, Sec. 1, Wunhua Rd., Banciao City, Taipei County 220, Taipei Hsien (TW)

( * ) Notice: Subject to any disclaimer, the term of this patent is extended or adjusted under 35 U.S.C. 154(b) by 576 days.

(21) Appl. No.: 11/004,890

(22) Filed: Dec. 7, 2004

(65) Prior Publication Data

US 2006/0232549 A1    Oct. 19, 2006

(51) Int. Cl.
*G09G 5/00*    (2006.01)
(52) U.S. Cl. ........................ 345/163; 345/174
(58) Field of Classification Search ........ 345/156–169; 315/111.21, 111.51; 219/121.21; 333/32; 330/294; 340/825.36
See application file for complete search history.

(56) References Cited

U.S. PATENT DOCUMENTS

| | | | | |
|---|---|---|---|---|
| 4,507,622 A | * | 3/1985 | Muth | .......................... 331/115 |
| 7,030,626 B2 | * | 4/2006 | Hayashi et al. | .............. 324/635 |
| 7,096,741 B2 | * | 8/2006 | Schneider | ..................... 73/765 |
| 7,146,845 B2 | * | 12/2006 | Raffalt | ......................... 73/1.83 |
| 2005/0141251 A1 | * | 6/2005 | Allwyn et al. | ................. 363/95 |
| 2005/0162228 A1 | * | 7/2005 | Putzeys | ...................... 330/251 |
| 2005/0248523 A1 | * | 11/2005 | Yu et al. | ...................... 345/102 |

* cited by examiner

*Primary Examiner*—Nitin I. Patel
(74) *Attorney, Agent, or Firm*—Bacon & Thomas, PLLC

(57) ABSTRACT

A non-contact electric inductance circuit for a power source converts input alternating current into signals with harmonic vibration and of high frequency, a coil of a set of corresponding receiver equipment receives the harmonic vibration of the signals to convert it into electric energy; wherein the entire electric inductance circuit has a driving circuit, a harmonic circuit, a feedback circuit, a micro-processing circuit and an adapted-to-adjusting-frequency oscillating circuit integrated with one another. When in operation, the alternating electric current passes to the harmonic circuit after being amplified through the driving circuit, and the feedback circuit transmits the voltage or current of the harmonic circuit to the micro-processing circuit that analyses the value of the voltage or current detected, in order that the entire electric inductance circuit can generate the best harmonic frequency.

12 Claims, 6 Drawing Sheets

NON-CONTACT ELECTRIC INDUCTANCE CIRCUIT FOR POWER SOURCE

BACKGROUND OF THE INVENTION

1. Field of the Invention

The present invention is related to the technique of a non-contact electric inductance circuit for a power source, and especially to improvement of circuit construction in an electric inductance circuit for a power source through alternating signals to emit harmonic vibration energy to a set of corresponding receiver equipment by wireless transmission, for the purpose of rendering the entire electric inductance circuit for the power source to generate the best harmonic frequency.

2. Description of the Prior Art

A conventional wireless non-battery mouse concerns a technique taking advantage of a fact that harmonic vibration energy provided by alternating signals can be obtained by a coil and further converted into electric energy to render a power source that is expected to be supplied for a mouse (or a set of related receiver equipment) to emit in the mode of wireless transmission (i.e., the receiver equipment and the power supply do not contact via circuit contact points).

Such a transmission technique for a power source in which harmonic vibration energy is emitted to a set of corresponding receiver equipment through alternating signals by wireless transmission mainly uses alternating electric current passing through a coil to generate signals of high frequency with harmonic vibration; while the coil of the corresponding receiver equipment receives the harmonic vibration of the signals of high frequency to convert it into electric energy. This means that the quality of the harmonic vibration (harmonic frequency) generated by the power supply (or the electric inductance circuit for the power source) will directly influence the subsequent electric energy received/converted from the receiver equipment.

And more, the harmonic vibration generated by the power supply (or the electric inductance circuit for the power source) mainly is formed through operations of an internal inductance and an internal capacitor; hence the expected harmonic frequency generated can be obtained by using the inductance and the capacitor of given specifications. However, practical operating efficiencies of inductances of same specification or capacitors of same specification still have some differences among themselves; thereby similar power supplies (or electric inductance circuits for power sources) shall further be added with related adjusting parts (or material) in the process of production to compensate the operation effects of the inductances or capacitors, and the adjusting parts must take cumbersome and repeated adjustment actions to render the harmonic frequencies generated to get the range asked; thereby, the yield of production of the similar power supplies (or electric inductance circuits for power sources) can not be effectively elevated, this in turn affects their market competitiveness.

SUMMARY OF THE INVENTION

The non-contact electric inductance circuit for a power source of the present invention is an electric inductance circuit for a power source emitting harmonic vibration energy to a set of corresponding receiver equipment through alternating signals by wireless transmission to electrically charge the receiver equipment or instantly supply the receiver equipment with operation power source. The entire supplying circuit of the electric inductance circuit for the power source basically has a driving circuit, a harmonic circuit, a feedback circuit, a micro-processing circuit and an adapted-to-adjusting-frequency oscillating circuit integrated with one another.

When in operation, the adapted-to-adjusting-frequency oscillating circuit generates alternating electric current that passes to the harmonic circuit after being amplified through the driving circuit, and the feedback circuit transmits the voltage or the current of the harmonic circuit to the micro-processing circuit that analyses the value of the voltage or the current detected, then the adapted-to-adjusting-frequency oscillating circuit adjusts the frequency of subsequent input alternating electric current, in order that the entire electric inductance circuit for the power source can generate the best harmonic frequency.

Moreover, the electric inductance circuit for the power source of the present invention can be further integrated with a signal processing circuit transmitted in the mode of radio signal transmission, so that the electric inductance circuit for the power source can be used as the equipment for the radio signal transmission (such as a signal receiver of a wireless mouse or a wireless keyboard), thereby the function and added value of the entire electric inductance circuit for the power source can be elevated.

The present invention will be apparent in its structure combination and entire mode of operation after reading the detailed description of the preferred embodiment thereof in reference to the accompanying drawings.

DETAILED DESCRIPTION OF THE PREFERRED EMBODIMENT

The non-contact electric inductance circuit 10 for a power source of the present invention is an electric inductance circuit for a power source emitting harmonic vibration energy to a set of corresponding receiver equipment through alternating signals by wireless transmission to electrically charge the receiver equipment or instantly supply the receiver equipment with operating power source. When in operation, this can be applied on transmission of electric power by the receiver equipment such as a wireless mouse, a wireless keyboard, a backlight board, a contact-control panel, a write pen etc., the receiver equipment such as the wireless mouse or the wireless keyboard etc. can obtain the electric power required for instant operation without any contact of circuit contacting point (this is so called non-contact transmission), or can be applied on electrically charging products to charge the electric power storing element in the equipment; and even can be applied on a circuit of a radio frequency identification system (RFID system) to generate an electric-wave magnetic field.

Figure 1:
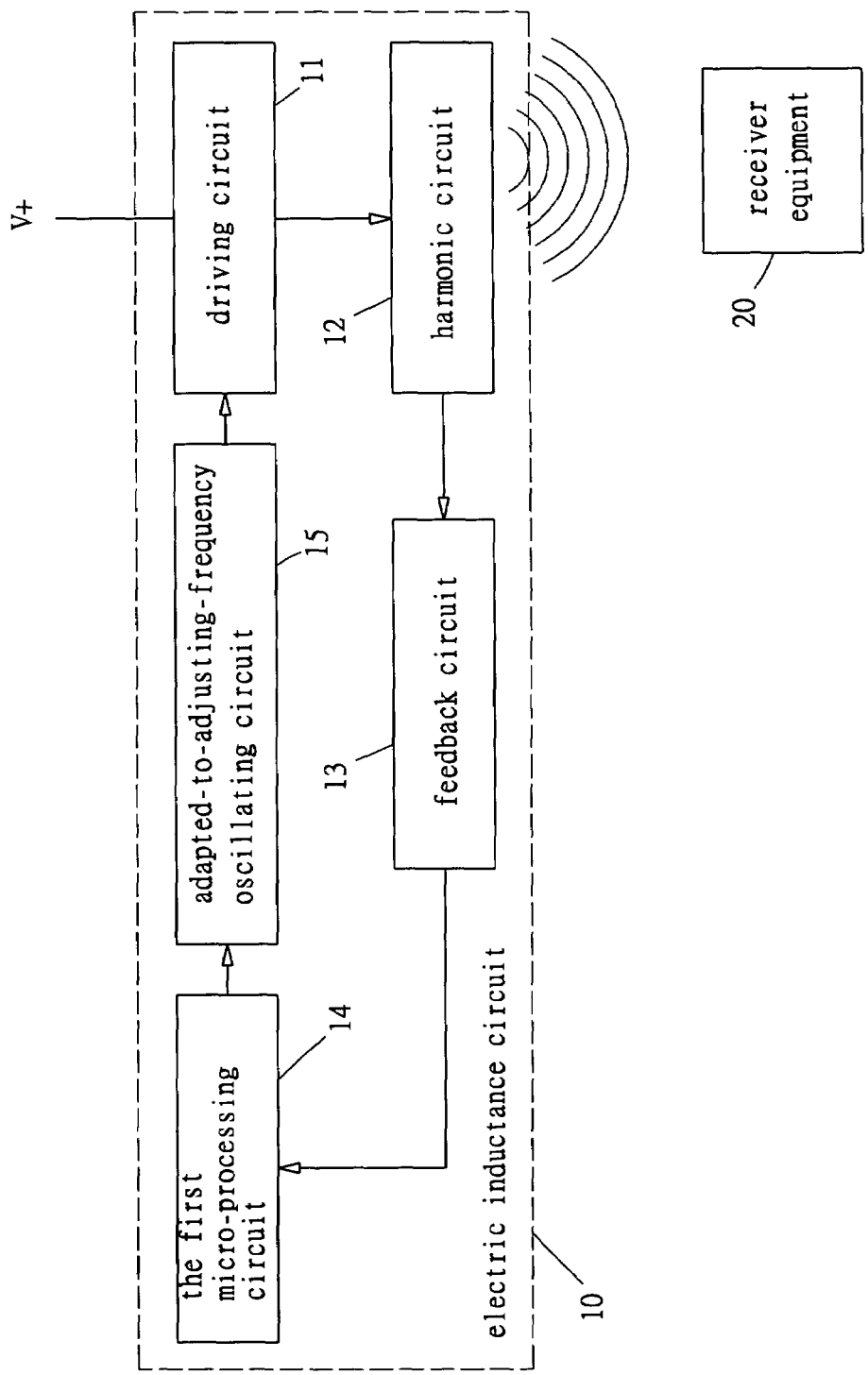
FIG. 1 is a block view showing the construction of a first preferred embodiment of an electric inductance circuit for a power source of the present invention.
Figure 2:
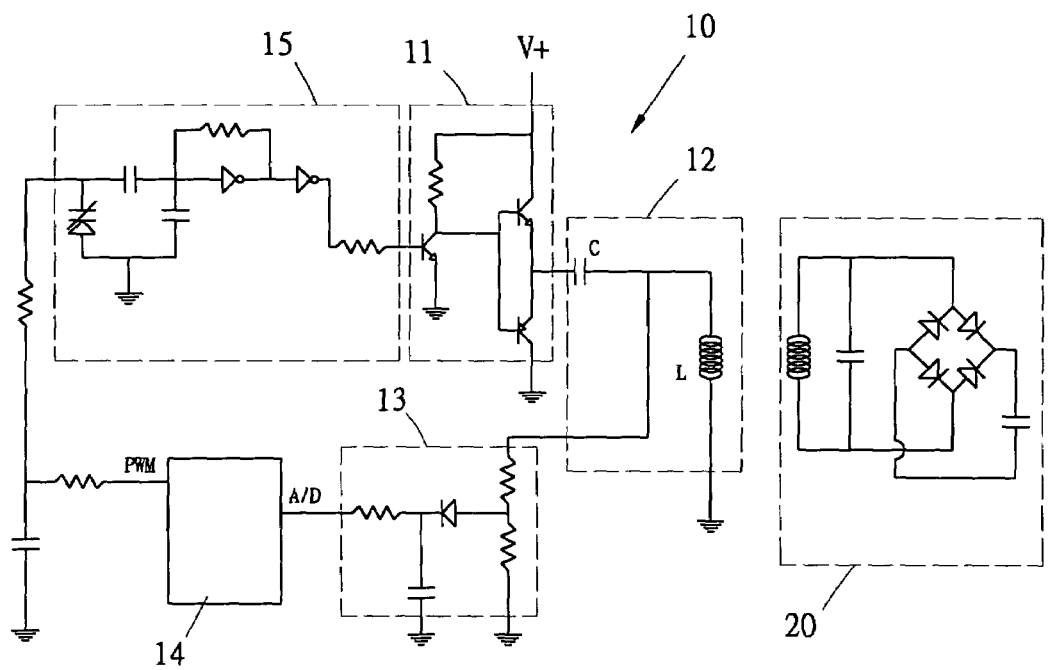
FIG. 2 is a circuit diagram of the first preferred embodiment of an electric inductance circuit for a power source of the present invention.

As shown in FIGS. 1 and 2, the entire electric inductance circuit 10 basically has a driving circuit 11, a harmonic circuit 12, a feedback circuit 13, a micro-processing circuit 14 (namely the first micro-processing circuit 14 marked in the drawing) and an adapted-to-adjusting-frequency oscillating circuit 15 integrated with one another. The driving circuit 11 can amplify an alternative current generated by the adapted-to-adjusting-frequency oscillating circuit 15 and pass to the harmonic circuit 12, and the input alternating electric current acquires a harmonic feature ($f=1/2\pi\sqrt{LC}$) through an inductance L and a capacitor C in the harmonic circuit 12, then the coil of a set of corresponding receiver equipment 20 can receive the harmonic vibration of signals, and the harmonic energy can be converted into electric energy.

And as mentioned in the "Description of the Prior Art" above, the harmonic frequency generated by operations of an inductance and a capacitor will not be an expected harmonic frequency solely because of identity of the specifications of parts assembled, hence the point of improvement of the present invention is to use the feedback circuit 13 to transmit the voltage or the current of the harmonic circuit 12 to the first micro-processing circuit 14 that analyses the value of the voltage or the current detected (to obtain the practically generated quality of the harmonic vibration, and to obtain by comparing the degree of difference thereof from the quality of the harmonic vibration set in advance), then the adapted-to-adjusting-frequency oscillating circuit 15 adjusts the frequency to generate the best harmonic frequency. Thereby the entire electric inductance circuit 10 for the power source can completely save the cumbersome adjusting operation during the process of production, and the yield of production of the non-contact electric inductance circuit 10 for the power source can be effectively elevated.

Figure 3:
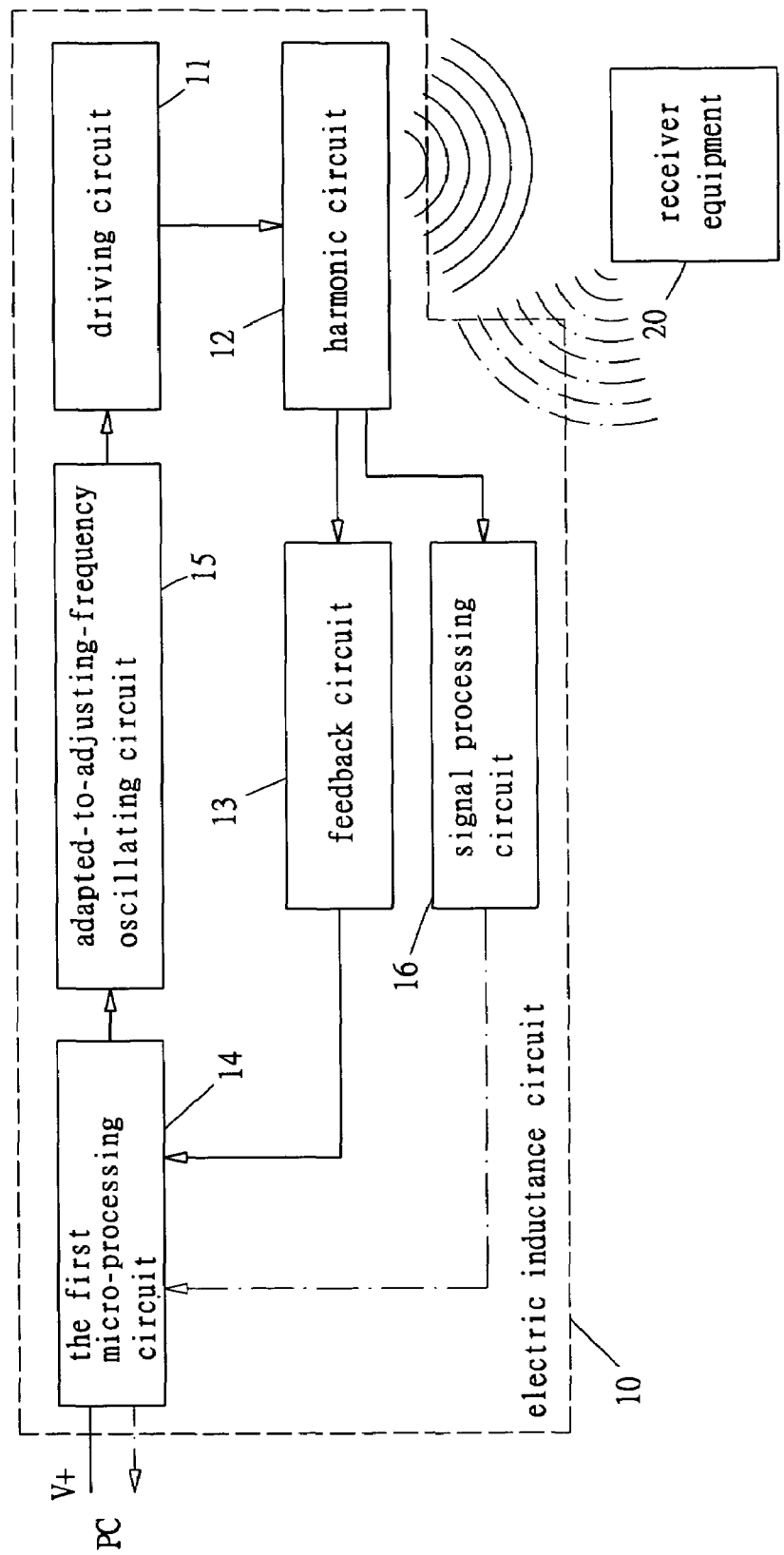
FIG. 3 is a block view showing the construction of a second preferred embodiment of an electric inductance circuit for a power source of the present invention.
Figure 4:
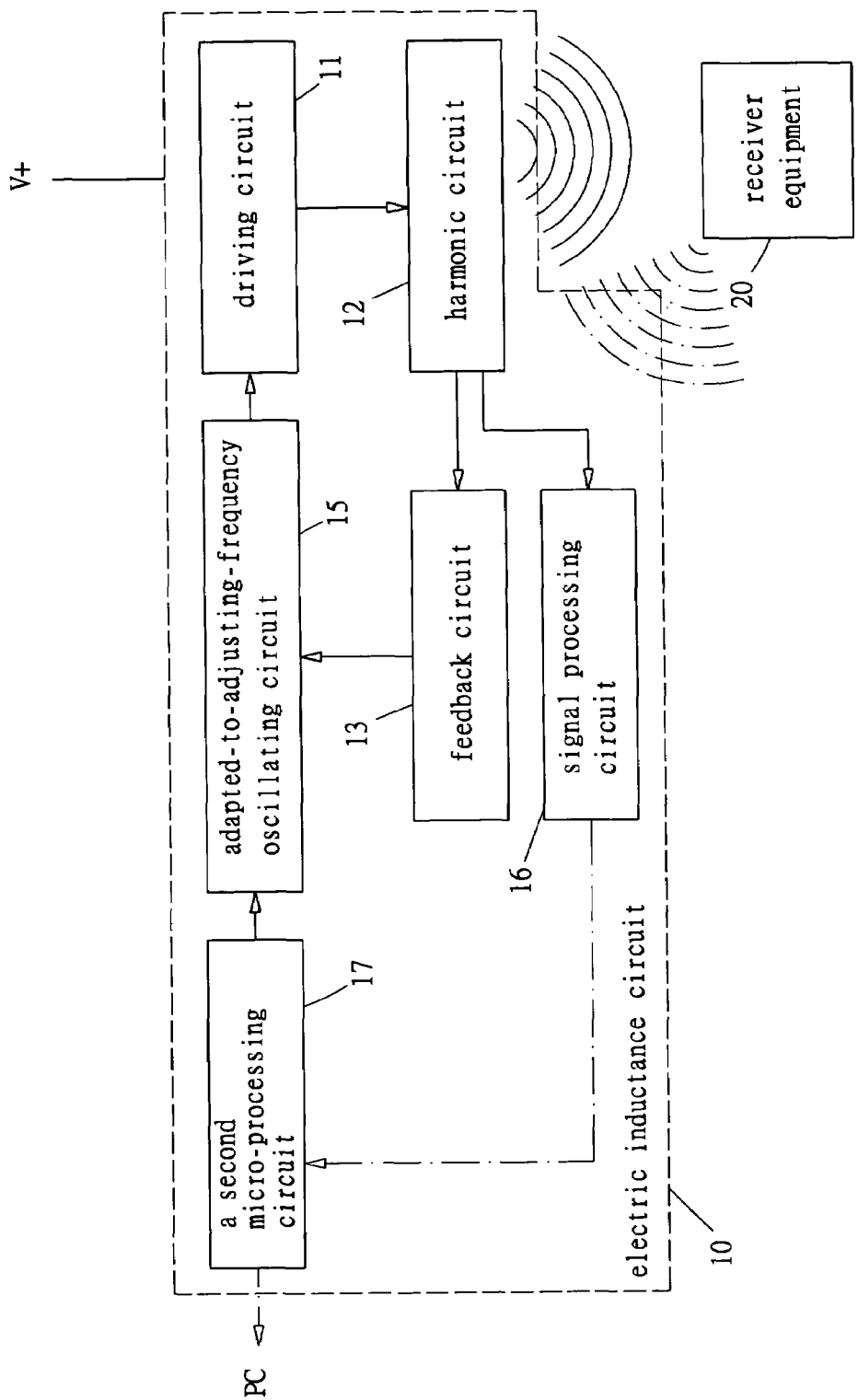
FIG. 4 is a block view showing the construction of a third preferred embodiment of an electric inductance circuit for a power source of the present invention.

And as shown in FIGS. 3 and 4, the electric inductance circuit 10 for the power source of the present invention can be further integrated with a signal processing circuit 16 specific for radio signal transmission, so that the electric inductance circuit 10 can be a set of radio-signal transmission equipment (such as a signal receiver of a wireless mouse or a wireless keyboard) for a personal computer (PC) or the like. When in practicing, such as is shown in FIG. 3, the micro-processing circuit 14 (namely the first micro-processing circuit 14) used originally for analyzing/adjusting the quality of the harmonic vibration is used to make connection of the power source with the radio signals, or as shown in FIG. 4, a micro-processing circuit (not shown) used originally for analyzing/adjusting the quality of the harmonic vibration is integrated with the feedback circuit 13, an outer portion of the feedback circuit 13 is integrated further with a second micro-processing circuit 17 (not shown) specific for signal connection to expect that effective work division can be achieved without lowering speed of radio signal transmission.

Figure 5:
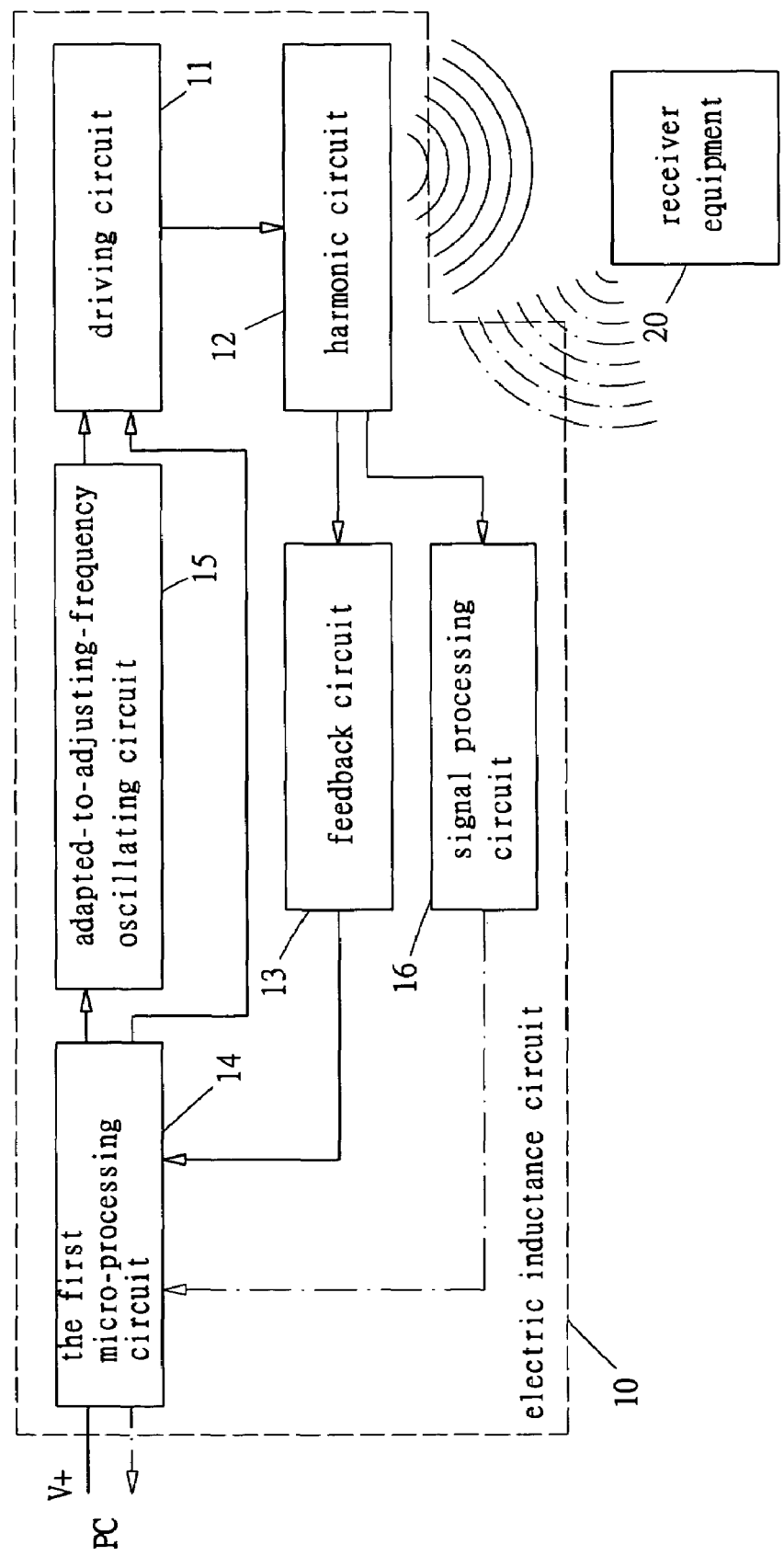
FIG. 5 is a block view showing the construction of a fourth preferred embodiment of an electric inductance circuit for a power source of the present invention.
Figure 6:
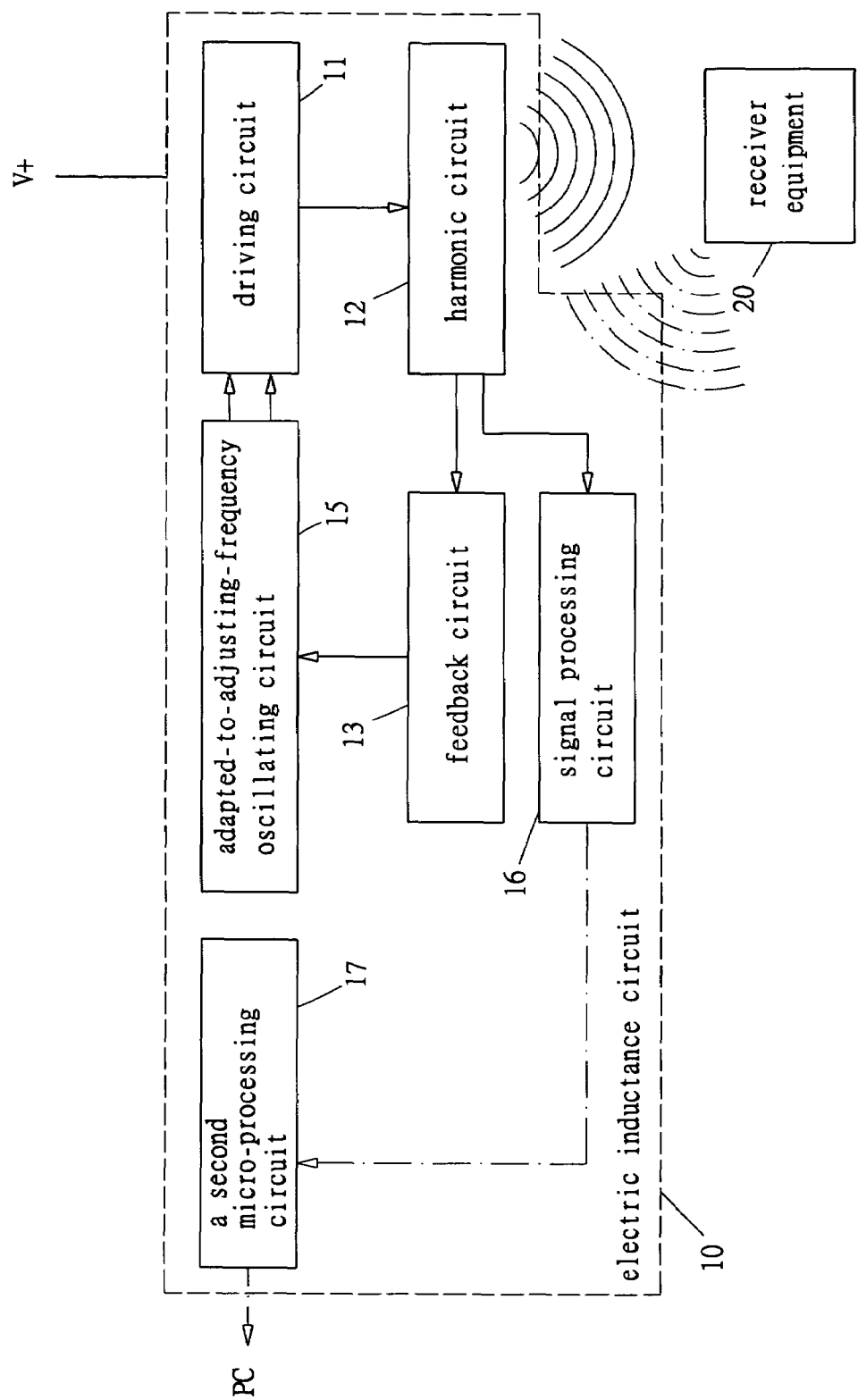
FIG. 6 is a block view showing the construction of a fifth preferred embodiment of an electric inductance circuit for a power source of the present invention.

One thing is worth mentioning, by virtue that the non-contact electric inductance circuit 10 for the power source of the present invention can continuously electrically charge an electric power storing element in the receiver equipment 20 when not in operation, thereby as shown in FIG. 5, a function of switching the mode of operation of the driving circuit 11 can be provided in the micro-processing circuit (namely the first micro-processing circuit 14 in FIG. 5) used originally for analyzing/adjusting the quality of the harmonic vibration, hence when it is in the state that the receiver equipment 20 emits radio signals, the driving circuit 11 is kept in the mode of operation of normally providing electric power; on the contrary, when it is in the state that the receiver equipment 20 does not emit radio signals (i.e., the receiver equipment 20 is in a non-operating state), the first micro-processing circuit 14 switches the driving circuit 11 to an operation mode of lowering output to avoid unnecessary consumption of electric power. Similarly, as shown in FIG. 6, a micro-processing circuit used originally for analyzing/adjusting the quality of the harmonic vibration is integrated with the feedback circuit 13, an outer portion of the feedback circuit 13 is integrated further with a second micro-processing circuit 17, this can also get the function of saving electric power without lowering speed of radio signal transmission.

As is the description disclosed above, the present invention provides preferred embodiments of electric inductance circuits for power sources; while the description and the drawings given are only for illustrating the embodiment of the present invention, and not for giving any limitation to the scope of the present invention; it will be apparent to those skilled in this art that various equivalent modifications or changes in structure, arrangement as well as feature without departing from the spirit of this invention shall also fall within the scope of the appended claims.

Having thus described the present invention, what I claim as new and desire to be secured by Letters Patent of the United States are:

1. A non-contact electric inductance circuit for a power source, said circuit amplifies an alternative current generated by an oscillator through a circuit driving circuit and pass to a harmonic circuit; wherein: said electric inductance circuit has a feedback circuit, a micro-processing circuit and an adapted-to-adjusting-frequency oscillating circuit integrated with one another, in order that said feedback circuit transmits voltage or current of said harmonic circuit to said micro-processing circuit that analyses quality of harmonic vibration practically generated, and obtains by comparing the degree of difference of said harmonic vibration from quality of a harmonic vibration set in advance), then said adapted-to-adjusting-frequency oscillating circuit adjusts frequency to get the best harmonic frequency.

2. The non-contact electric inductance circuit for a power source as in claim 1, wherein: said electric inductance circuit is further integrated with a signal processing circuit transmitted in a mode of radio signal transmission.

3. The non-contact electric inductance circuit for a power source as in claim 2, wherein: said micro-processing circuit is integrated with said feedback circuit, an outer portion of said feedback circuit is integrated further with another micro-processing circuit for radio signal transmission.

4. The non-contact electric inductance circuit for a power source as in claim 1, wherein: said electric inductance circuit is further integrated with another signal processing circuit for radio signal transmission, said micro-processing circuit is given a function of switching mode of operation of said driving circuit.

5. The non-contact electric inductance circuit for a power source as in claim 4, wherein: said micro-processing circuit is integrated with said feedback circuit, an outer portion of said feedback circuit is integrated further with another micro-processing circuit for radio signal transmission.

6. The non-contact electric inductance circuit for a power source as in claim 1, wherein: said non-contact electric inductance circuit is applied on non-contact electrically charging products.

7. The non-contact electric inductance circuit for a power source as in claim 1, wherein: said non-contact electric inductance circuit is applied on a radio-frequency identification system.

8. The non-contact electric inductance circuit for a power source as in claim 1, wherein: said non-contact electric inductance circuit is applied on a backlight board.

9. The non-contact electric inductance circuit for a power source as in claim 1, wherein: said non-contact electric inductance circuit is applied on a wireless mouse.

10. The non-contact electric inductance circuit for a power source as in claim 1, wherein: said non-contact electric inductance circuit is applied on a wireless keyboard.

11. The non-contact electric inductance circuit for a power source as in claim 1, wherein: said non-contact electric inductance circuit is applied on a contact-control panel.

12. The non-contact electric inductance circuit for a power source as in claim 1, wherein: said non-contact electric inductance circuit is applied on a write pen.

* * * * *